United States Patent [19]

Heenan

[11] 4,208,090

[45] Jun. 17, 1980

[54] REFLECTOR STRUCTURE

[75] Inventor: Sidney A. Heenan, Park Ridge, Ill.

[73] Assignee: Amerace Corporation, New York, N.Y.

[21] Appl. No.: 753,132

[22] Filed: Dec. 22, 1976

Related U.S. Application Data

[63] Continuation of Ser. No. 625,723, Mar. 24, 1967, abandoned.

[51] Int. Cl.² ............................................. G02B 00/00
[52] U.S. Cl. ........................................ 350/61; 350/97; 350/103; 404/14
[58] Field of Search ................................. 350/96–109, 350/61; 404/12, 13, 14, 9, 10, 11, 15, 16

[56] References Cited

U.S. PATENT DOCUMENTS

| | | | |
|---|---|---|---|
| 3,140,340 | 7/1964 | Weber | 350/105 |
| 3,266,371 | 8/1966 | Gunderson | 350/103 |
| 3,359,671 | 12/1967 | Nier et al. | 350/105 |
| 3,924,929 | 12/1975 | Holmen et al. | 350/105 |

Primary Examiner—John K. Corbin
Assistant Examiner—B. W. de los Reyes
Attorney, Agent, or Firm—Richard A. Craig; S. Michael Bender; Ronald A. Sandler

[57] ABSTRACT

There is disclosed a reflector structure that is highly visible both in daylight and at night, the structure including a body of transparent material having a front face and a rear face, the rear face including a continuous support surface having therein a plurality of recesses each defining a cell surrounded by a support wall, a plurality of retrodirective reflector elements disposed in the recesses for reflecting light falling upon the front face back toward the source thereof to render the reflector structure highly visible at night, and a backing member covering the rear face and hermetically sealed to the support surface thus hermetically to seal each of the cells to prevent entry of water, dirt and the like thereinto so as to preserve the reflecting properties of the reflector elements.

8 Claims, 14 Drawing Figures

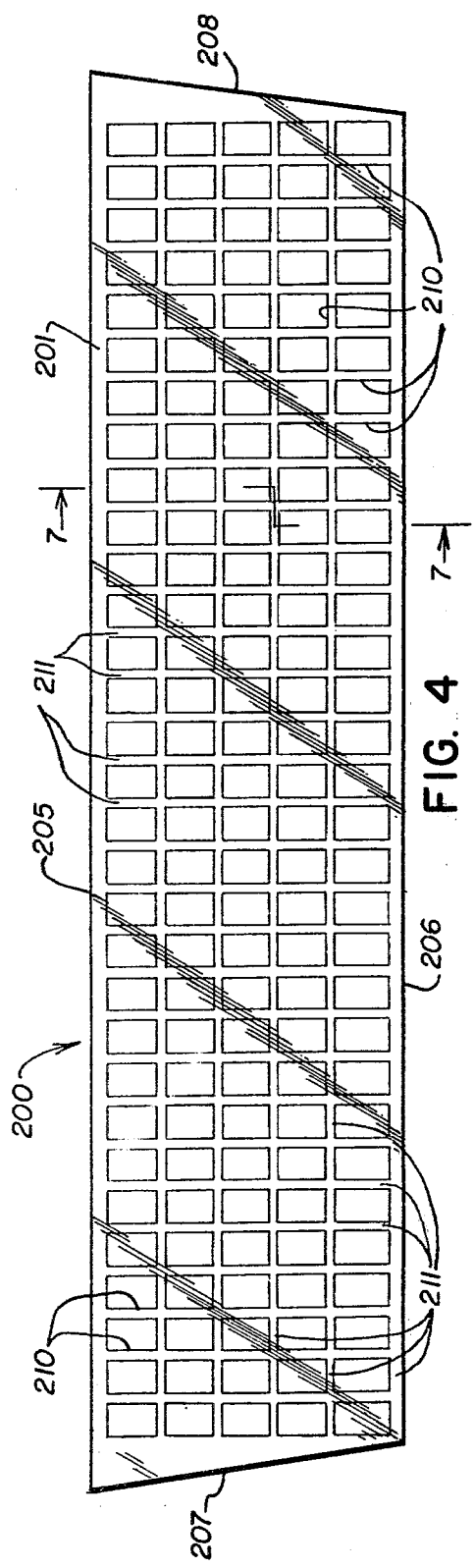
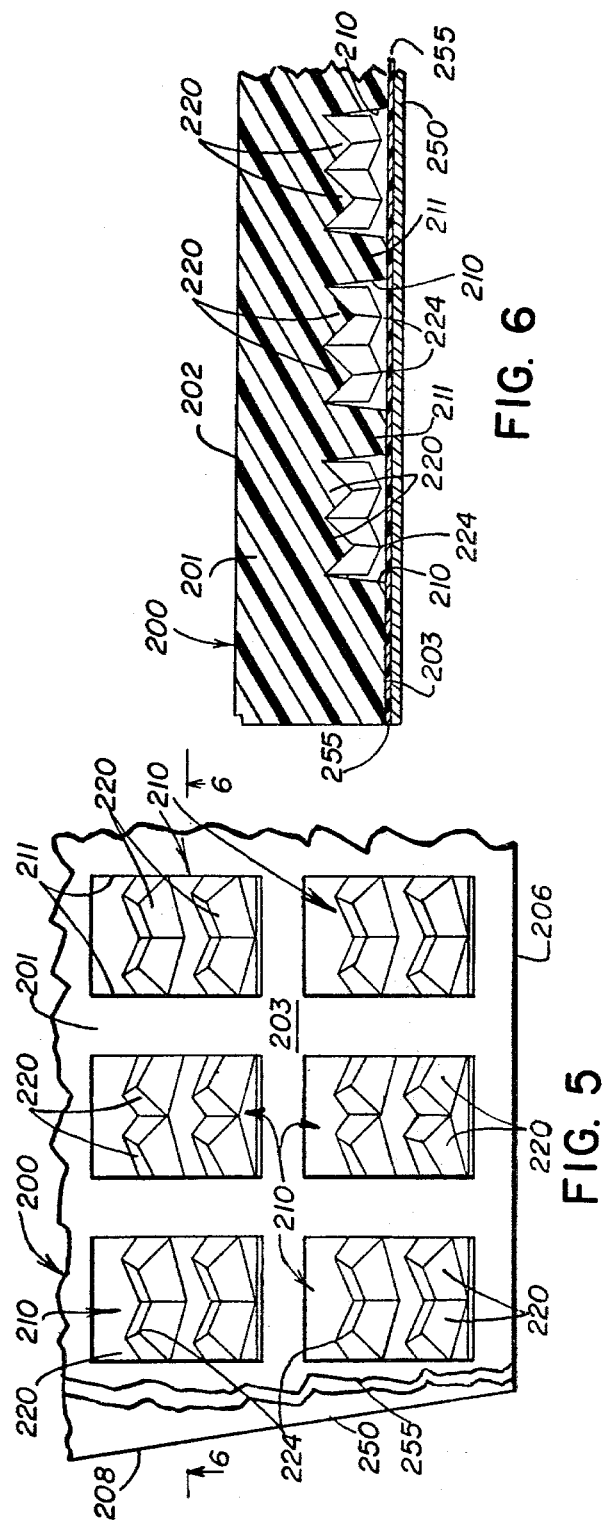

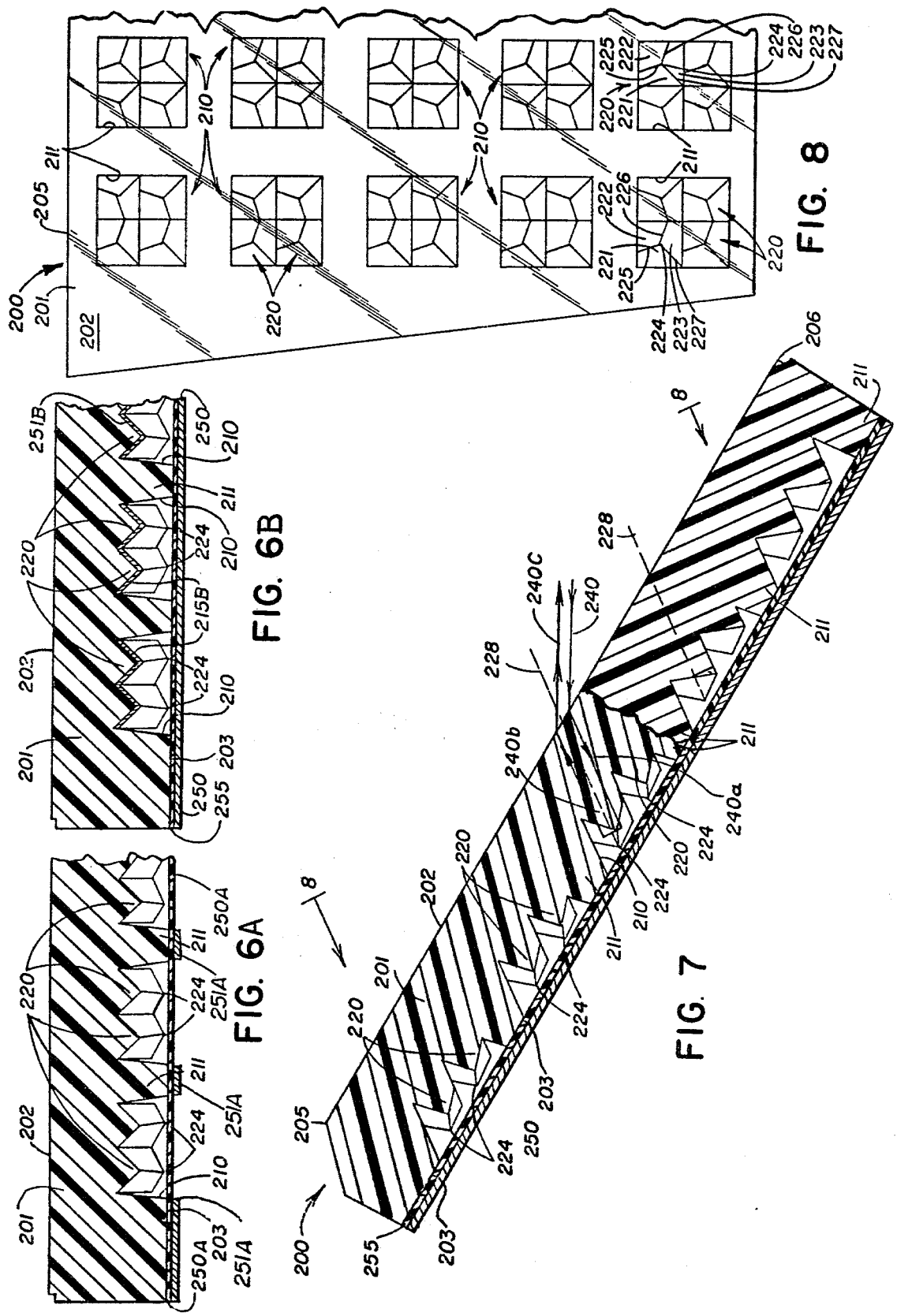

REFLECTOR STRUCTURE

This is a continuation of application Ser. No. 625,723, filed Mar. 24, 1967, now abandoned.

The present invention is directed to an improved reflector structure that is highly visible both in daylight and at night, the night visibility being provided by reflector elements disposed on the rear of the reflector structure and disposed in individual cells that are hermetically sealed.

In reflector structures of the type described herein, the reflector elements that provide night visibility appear dark in the daylight and contribute substantially nothing to the daylight visibility of the reflector structure, and conversely, those portions of the reflector structure providing the daylight visibility appear substantially dark at night and contribute substantially nothing to the night visibility of the reflector structure. One form of reflector structure of the present invention further is specifically designed to be subjected to high loads and high impacts such as large vehicles bearing directly thereon and traveling thereover, and in addition all of the reflector structures of the present invention are exposed to all types of weather conditions and all types of abuse incident to outdoor use on and adjacent to highways.

It is an important object of the present invention to provide a reflector structure that is useful both for reflecting daylight falling generally upon the front face thereof to render the reflector structure highly visible in daylight and for reflecting light falling upon the front face thereof to reflect the light back toward the source thereof to render the reflector structure highly visible at night in the headlights of a vehicle, for example, directed toward the reflector structure.

Another object of the invention is to provide an improved reflector structure of the type set forth including a body of transparent material wherein there is provided on the rear face thereof a first area fundamentally devoted to daylight reflection and a second area in the form of individual cells devoted to night time reflection, the cells having therein reflector elements of the retrodirective type and comprising from about 10% to about 90% of the total area of the rear face, a preferred arrangement being one wherein approximately 50% of the total area of the rear face is cells.

Yet another object of the invention is to provide an improved reflector structure of the type set forth wherein a backing member is provided on the rear face of the reflector body, the backing hermetically sealing each of the cells to prevent the entry of water, dirt, and the like thereinto, the rearmost portion of the reflector elements in the cells preferably being spaced forwardly a short distance away from the adjacent surface of the backing member.

Another object of the invention is to provide an improved reflector structure which is very thin but is possessed of great strength due to the presence of reinforcing ribs throughout the area thereof.

Still another object of the invention is to provide an improved reflector structure having a plurality of cells in the rear thereof all hermetically sealed by a backing member as set forth hereinabove, whereby a break in one cell will not cause a break in or be propagated to adjacent cells, thereby to preserve the hermetic seal of the adjacent cells and to maintain the light reflecting properties of the unimpaired reflecting surfaces therein.

In connection with the foregoing object, it is another object of the present invention to provide an improved reflector structure of the type set forth that has better weatherability characteristics.

Yet another object of the invention is to provide an improved retroreflective sheet having a plurality of cells in the rear thereof all hermetically sealed by a backing member as set forth hereinabove, the sheet being thin and readily cut into indicia that are even complicated in shape, the size of the cells being small so that cells broken during cutting do not materially adversely affect the retroreflecting properties of the sheet and the breaks in the cut cells are not propagated to adjacent cells, thereby to preserve the hermetic seal of the adjacent cells and thus further to maintain the light reflecting properties of the sheet.

Another object of the present invention is to provide an improved reflector structure of the type set forth wherein the major dimension of each of the cells as viewed in the front face is no greater than about 0.35 inch and the distances between adjacent ones of the cells as viewed in the front face is no greater than about 0.35 inch, whereby when the reflector structure is viewed in the front face at a distance of about one hundred feet or more, it appears uniformly lighted throughout and of the same shape both when lighted by daylight falling upon the front face and when lighted by light from the headlights of an oncoming vehicle, for example, falling upon the front face and reflected back toward the source of light by the reflector elements.

Still another object of the invention is to provide a reflector surface having a backing member, wherein the backing member is a thin metal foil adhesively secured to the rear face, the adhesive preferably being a heat-sealable synthetic plastic material fusion bonded to the rear face to provide a hermetic seal therebetween.

Further features of the invention pertain to the particular arrangement of the parts of the reflector structure whereby the above-outlined and additional features thereof are attained.

The invention, both as to its organization and method of operation, together with further objects and advantages thereof, will best be understood by reference to the following specification taken in connection with the accompanying drawings, in which:

FIG. 4 is an enlarged plan view of a reflector structure made in accordance with the present invention;

FIG. 5 is a fragmentary enlarged plan view of the rear of the lower righthand corner of the reflector structure of FIG. 4, the backing member having been broken away;

FIG. 6 is a view in section along the line 6—6 of FIG. 5;

FIG. 6A is a view similar to FIG. 6 and showing a modification of the reflector structure;

FIG. 6B is another view similar to FIG. 6 and illustrating another modification of the reflector structure;

FIG. 7 is a view in vertical section on a still further enlarged scale along the line 7—7 of FIG. 4;

FIG. 8 is a further enlarged view of the righthand end of the reflector structure of FIG. 4 as viewed in the direction of the arrows along the line 8—8 of FIG. 7;

Figure 1:
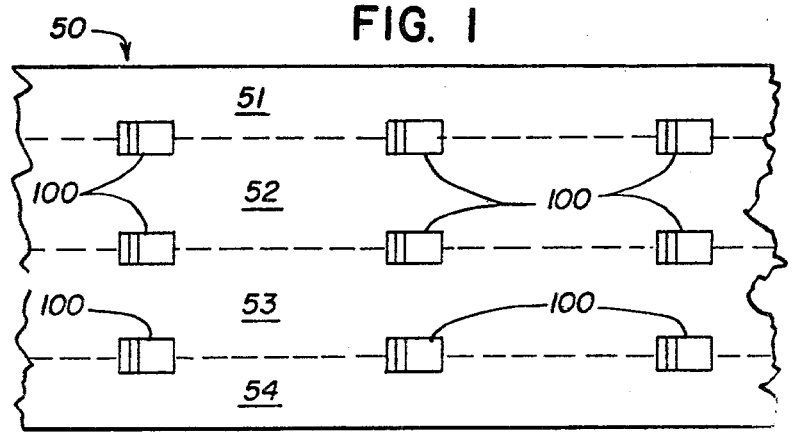
FIG. 1 is a diagrammatic view illustrating the placement of pavement markers along a highway the pavement markers incorporating therein reflector structures of the present invention.
Figure 2:
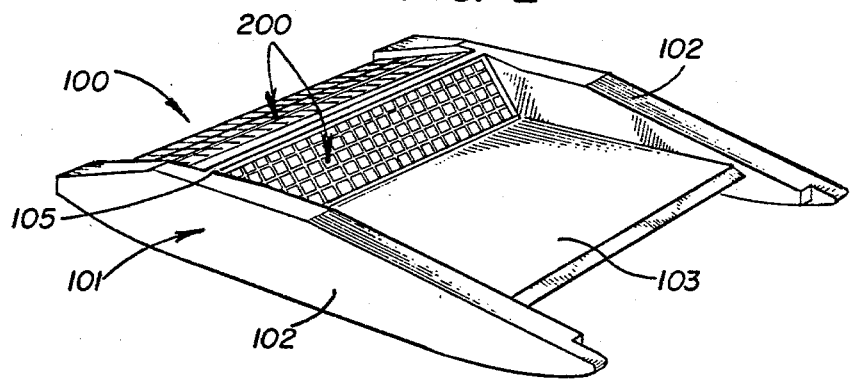
FIG. 2 is a perspective view of a pavement marker carrying thereon a reflector structure of the present invention.
Figure 3:
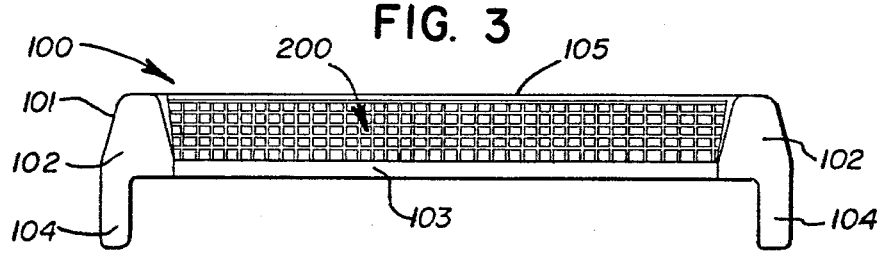
FIG. 3 is a view of the rear of the pavement marker of FIG. 2.

Referring to FIGS. 1 to 3 of the drawings, there is illustrated a highway marker 100 which incorporates therein two reflector structures 200 made in accordance with and embodying the principles of the present invention. The highway marker 100 is particularly useful in indicating lanes in a highway, such for example as illustrated in FIG. 1, wherein a highway 50 is divided into four lanes 51, 52, 53 and 54. In order to mark the boundaries of the lanes 51, 52, 53 and 54, a plurality of the highway markers 100 are arranged in aligned rows thus to direct lanes of traffic respectively along the highway lanes 51, 52, 53 and 54 of the highway 50.

It will be appreciated that in the use of the highway markers 100, it is highly desirable that the markers 100 be fully visible both in the daylight and at night; the daytime visibility is provided by random light falling on the reflector structure 200 and being specularly reflected thereby into the eyes of the drivers, and the nighttime visibility is provided by the light from the headlights of automobiles falling upon the reflector structures 200 and being retrodirectively reflected thereby into the eyes of the drivers. In order to mount and hold the reflector structures 200 in the preferred operating position upon the highway 50, for example, the highway markers 100 include a metal base 101 having upstanding side walls 102 joined by a plate 103 that is adapted to be disposed upon the surface of the associated highway, the side walls 102 including portions 104 disposed below the plate 103 and extending into grooves in the highway, a suitable resin such as an epoxy resin being provided firmly to mount and secure the base 101 in position on the highway. A pair of mounting plates 105 also extend between the side walls 102 and are inclined at an angle of for example 30° with respect to the plate 103 to mount the two reflector structures 200 in the inclined positions shown.

The details of construction of the reflector structures 200 are illustrated in FIGS. 4 to 8 of the drawings, wherein it will be seen in FIG. 4 that each reflector structure 200 includes a body 201 of synthetic organic plastic resin, the preferred resin being a methyl methacrylate resin, the body 201 providing a substantially flat front face 202 and a substantially flat rear face 203. In outline as viewed in FIG. 4, the reflector structure 200 is in the general form of a trapezoid having a longer edge 205 normally oriented upwardly in use, a shorter lower edge 206 and a pair of normally upwardly and outwardly inclined side edges 207 and 208.

A plurality of recesses or cells 210 are provided in the rear face 203 of the body 201, the recesses also serving to define support walls or ribs 211 that surround each of the recesses 210, the cells 210 being rectangular as viewed perpendicular to the front face 202 as in FIG. 4 but being essentially square when viewed in the direction of the arrows along the line 8—8 in FIG. 7 (see the illustration in FIG. 8) and in effect constituting islands in the rear face 203. In order to serve at night as a reflector for light from the headlight of an approaching automobile, each of the cells 210 is provided throughout the area thereof with a plurality of reflector elements 220, the reflector elements 220 being of the retrodirective type and specifically of the cube corner type. Referring particularly to FIG. 8, it will be seen that each of the cells 210 includes four reflector elements 220, each of the reflector elements 220 being square in plan view as seen in FIG. 8 with four of the reflector elements 220 arranged to form a larger square completely filling the associated cell 210. Each reflector element 220 further includes three reflecting surfaces 221, 222 and 223 disposed mutually perpendicular one to the other and joining at a rear corner or apex 224 and along edges 225, 226 and 227 extending forwardly from the corner 224; more particularly, the edge 225 is disposed between the reflecting surfaces 221 and 222, the edge 226 is disposed between the reflecting surfaces 222 and 223, and the edge 227 is disposed between the reflecting surfaces 221 and 223. It further is pointed out that the edges 225 and 226 are directed toward and terminate at points intermediate the ends of the adjacent side of the reflector element 220, whereas the edge 227 extends to and terminates at a corner of the reflector element 220. It will be appreciated that each of the reflector elements 220 comprises a triple mirror reflex reflector that serves effectively to reflect retrodirectively incident light falling thereon.

Each of the reflector element 220 also has a cube corner axis about which the reflecting surfaces 221, 222 and 223 are symmetrically arranged, and in order to obtain good reflecton, it is desirable that the light from headlights entering the reflector element 220 be directed along lines essentially parallel to the cube corner axis 228. In order to accomplish this, the cube corner axes 228 have been arranged at an acute angle with respect to the front face 202, and specifically at an angle of approximately 65° 30' with respect thereto, and in use are disposed at an angle of approximately 24° 30' with respect to the horizontal. This inclination of the cube corner axes has been found desirable in order to permit the front surface 202 to be inclined at an angle of approximately 30° with respect to the horizontal in use and still obtain a good reflected signal from the reflector elements 220 when light falls thereon from the heatlights of oncoming vehicles. More particularly, it has been found that in use the front face 202 of the reflector body 201 is wiped clean and not too greatly abraded by automobile tires passing therewover provided that the front face 202 is disposed at an angle of approximately 30° with respect to the horizontal, i.e., the position illustrated in FIG. 7 of the drawings. Moreover, the light emanating from oncoming automobiles is practically parallel to the highway surface at distances from which the marker 100 must be viewed, whereby the light from the headlights of oncoming vehicles strikes the front face 202 at an acute angle of approximately 30°.

The manner in which the reflector elements 220 operate to reflect incident light falling upon the front face 202 at an acute angle of about 30° back toward the source of the incident light as illustrated in FIG. 7. An incident ray 240 from the headlights of a oncoming vehicle directed generally horizontally strikes the front surface 202 at an angle of about 30° and in passing into the body 201 is refracted as at 240a into a path substantially parallel to the cube corner axis 228 of the associated reflector element 220. The ray 240a strikes at least two of the reflecting surfaces 221, 222 and 223 of the reflector element 220 and is reflected back therefrom as at 240b through the body 201 and to the front face 202. At the front face 202, the ray 240b is refracted to provide the exit ray 240c which is directed rearwardly toward the source of the incident ray 240 and substantially parallel to the incident ray 240.

From FIGS. 4, 5 and 8 it will be seen that substantially 50% of the total area of the rear of the reflector body 201 is devoted to the flat surface 203 and substantially 50% of the total area of the rear of the body 201 is devoted to the cells 210 having disposed therein the reflector elements 220. It also is pointed out that the rear surface 203 is continuous in the sense that any point on the surface can be reached from any other point on the surface without leaving the surface, and it also is pointed out that each of the cells 210 is completely surrounded by the walls 211 and the area thereof completely surrounded by the surface 203. Within each of the cells 210, the area thereof is completely filled by closely packed and interfitting regular geometric shapes, the reflector elements 220 having square outlines as viewed in FIG. 8 and rectangular outlines as viewed in FIGS. 4 and 5, all as has been explained hereinabove. There more specifically is provided in each cell 210 four of the reflector elements 220, the reflector elements 220 having a first orientation with respect to the body 201 in the vertical row of cells 210 disposed to the left in FIG. 8, and having a second and different orientation with respect to the body 201 in the vertical row disposed to the right in FIG. 8. It will be understood that other types of retrodirective reflector elements may be used in place of the reflector elements 220, and other geometric shapes and other arrangements of the reflector surfaces can be utilized effectively in the present invention.

It has been found that adequate daytime visibility and nighttime visibility is provided by the reflector structure 100 when the area of the surface 203 includes from about 10% to about 90% of the total area of the rear of the body 201 and conversely, when the combined area of the cells 210 includes from about 10% to about 90% of the total area of the rear of the body 201, the preferred construction being one in which approximately 50% of the total area of the rear of the body 201 is devoted to the surface 203 and approximately 50% of the rear of the body 201 is devoted to the cells 210. In this connection it is noted that in daylight the cells 210 appear dark and contribute substantially no signal and conversely at night the surface 203 appears dark and contributes substantially no signal. It further is desirable that the reflector structure 200 when viewed from the front at a distance from about one hundred feet or more appear uniformly lighted throughout the area thereof and appear to be of the same shape both when lighted by daylight falling upon the front face in the area thereof corresponding to the surface 203 for the reflecting of daylight therefrom and when lighted by light from an oncoming vehicle falling upon the front face 202 in the area thereof corresponding to the cells 210 for reflecting light back toward the vehicle. To this end the major dimensions of each of the cells 210 as viewed in the front face 202 is no greater than about 0.35 inch and the distances between adjacent ones of the cells 210 as viewed in the front face 202 is no greater than about 0.35 inch. When the parts have these dimensions, the human eye at one hundred feet cannot distinguish between or resolve the individual elements seen through the front face 402, whereby the front face 202 appears to be uniformly lighted and of uniform shape both in the daylight when lighted by random light and at night when lighted by the headlights of an oncoming vehicle.

The rear of the reflector structure 200 is sealed by a backing member 250 which in the form of the invention illustrated in FIGS. 6 and 7 is in the form of a thin metal foil secured to the surface 203 throughout the area thereof by a thin film-like coating 255 of heat-sealable synthetic plastic material that is fusion bonded upon both the surface 203 and the adjacent surface of the metal foil 250. The metal foil 250 may be formed for example of lead or aluminum metal, and may have a thickness in the range from about 1 mil to about 5 mils. Further details of such a backing member 250 and the coating 255 may be found in U.S. Pat. No. 2,791,938 granted May 14, 1957 to Harold A. Doolittle and Sidney A. Heenan for LIGHT REFLECTORS, the disclosure of that patent being incorporated herein by reference.

The backing member 250 serves to cover and hermetically to seal each of the cells 210 in a manner independent of each and every other cell 210 in the reflector structure 200. As a result, the backing member 250 serves positively to exclude water, dirt and the like from the cells 210 and thus to prevent the placement of such materials upon the reflecting surfaces 221, 222 and 223 of the reflector elements 220, thereby to preserve unimpaired the optimum light reflecting properties thereof. Since each of the cells 210 is individually sealed independent of each and every other cell, any break in the backing member 250 or in the plastic body 201 which may permit access of water, dirt and the like to one cell will not adversely affect other cells 210 which are independently hermetically sealed. Consequently, the reflector structure 210 exhibits greater weatherability and durability in use, even when the reflector structure is extremely thin, as will be explained more fully hereinafter, since a break or impairment in one of the cells 210 will not be propagated to adjacent cells 210 in accordance with the present invention.

It further is pointed out that the support walls 211 extend throughout the rear area of the plastic body 201 and in the final assembly of the reflector structure 200 on the marker base 101 distribute the forces applied to the front face 202 throughout the area of the plastic body 201. In other words, there is support for the plastic body 201 throughout the area thereof, the only portions not having direct support being in the individual cells 210. As a consequence, the completed reflector structure 200 has great strength even when the total thickness thereof is only a fraction of an inch, all as will be explained more fully hereinafter.

The coating 255 is transparent, whereby the surface of the backing member 250 disposed toward the rear face 203 of the reflector body 201 is visible, and preferably forms the reflecting surface for reflecting daylight to achieve daylight visibility of the reflector structure 200. Alternatively, a light reflecting film such as a metallized film, may be placed on the surface 203 or on the front surface 202 that corresponds to and is coextensive with the surface 203. However, it will be appreciated that it is preferred to protect the reflecting surface giving daylight visibility, wherefore the utilization of the front surface of the backing member 250, which may be formed of polished aluminum, for example, as the daylight reflecting surface is to be preferred.

It also is pointed out that the reflector body 201 may be formed of clear synthetic organic plastic resin, whereby a white beam of light is reflected thereby both in daylight and at night. However, a color such as red, yellow, blue and the like may be incorporated in the body 201, thereby to give a colored signal both in daylight and at night. Alternatively, the reflecting surfaces of the body 201 may be colored, thereby to give colored reflections therefrom.

The reflector structure 200 is conveniently mounted upon the highway marker base 101 by means of a suitable resin, an epoxy resin being preferred for this purpose. In a typical construction of the highway marker 100 and of the reflector structure 200 used therein, the edge 205 has a length of 4.0 inches; the edge 206 has a length of 3.675 inch; the edges 207 and 208 have a length of 0.85 inch; the distance between the surfaces 202 and 203 is 0.105 inch; the distance between the corner 224 and the adjacent surface of the backing member 250 is 0.010 inch; the length of the side of each of the cells 210 as viewed in FIG. 8 is 0.08 inch; the vertical dimension of each cell 210 as viewed in FIG. 4 is 0.10 inch; and the width of each side wall 211 between adjacent cells 210 is 0.04 inch, the width thereof preferably being at least about 0.01 inch.

In a first modification of the reflector structure 200, the coating 255 may be simply an adhesive that sets at room temperature rather than a heat-sealable adhesive of the type described hereinabove. In another modification of the invention, it is contemplated that the adhesive coating 255 be light reflecting rather than light transmitting whereby the adhesive coating 255 constitutes a reflecting surface throughout the area of the rear surface 203, thereby to provide for the reflection of daylight for daytime visibility. In other modifications, the desired daylight reflecting areas are painted to provide the desired color and daylight reflecting characteristics.

There is shown in FIG. 6A of the drawings a still further modification of the present invention wherein the backing member 250A is a sheet of synthetic organic plastic resin, such as a sheet of acrylic film that is joined directly to the reflector body 201 as by ultrasonic welding. In this form of the invention, inasmuch as the film 250A is transparent, selected portions thereof corresponding to the rear surface 203 are rendered reflective as by metallizing at 251A to render that area light reflecting to provide daylight visibility. It will be understood that the sheet 250A serves hermetically to seal the cells 210, thereby to provide all of the advantages of the backing member 250 described above with respect to FIG. 6. In yet another form of the invention, the film 252A may be opaque and light diffusing, in which case there is no need to provide the metallized layer 251A illustrated in FIG. 6A.

Referring to FIG. 6B of the drawings, there is shown a further modification of the invention wherein the several reflecting surfaces 221, 222 and 223 on each reflector element 220 is coated with a thin layer of metal, such as aluminum, i.e., these surfaces are metalized, to increase the reflectivity thereof at wide entrance angles. More specifically, each of the reflecting surfaces 221, 222 and 223 is provided respectively with a thin layer 251B of metal, such as aluminum, thereon. In applying the layers 251B, the entire rear surface of the body 201 may be metallized, and thereafter selected areas thereof, such as the surface 203, may have the metal removed therefrom as by a release hot-stamp process.

Figure 9:
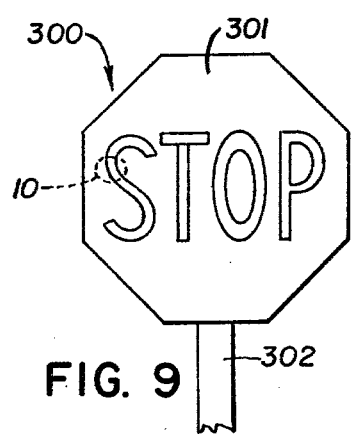
FIG. 9 is a view of a stop sign having the letters thereon formed from retroreflective sheets made in accordance with the present invention.

Referring to FIGS. 9 to 12 of the drawings, and specifically to FIG. 9, there is illustrated therein a stop sign 300 including the usual octagonal shaped support mounted on a post 302. In accordance with the present invention, the letters spelling out the word "STOP" are formed from a retroreflective sheet 400. Originally the retroreflective sheet 400 may have been rectangular in shape, for example, and has been cut into the shapes illustrated to provide the various letters on the stop sign 300 by cutting with a scissors, for example.

Figure 10:
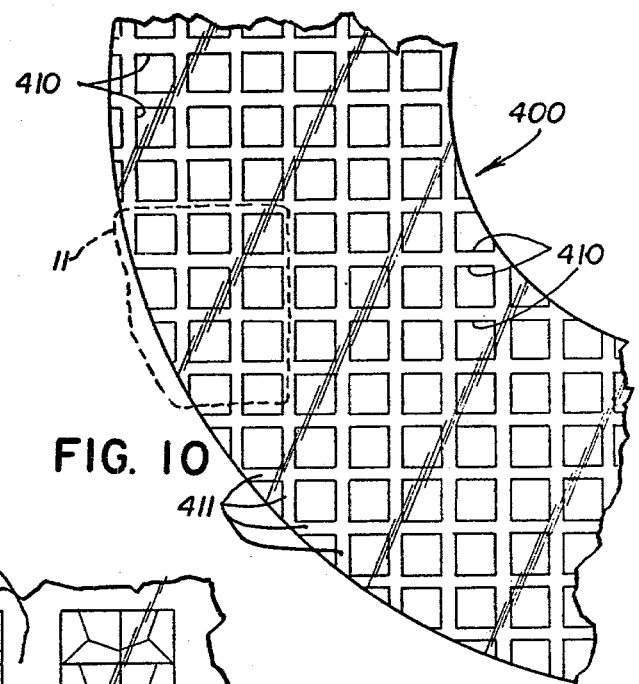
FIG. 10 is a fragmentary plan view on an enlarged scale of that portion of FIG. 9 enclosed within the circle marked 10.
Figure 11:
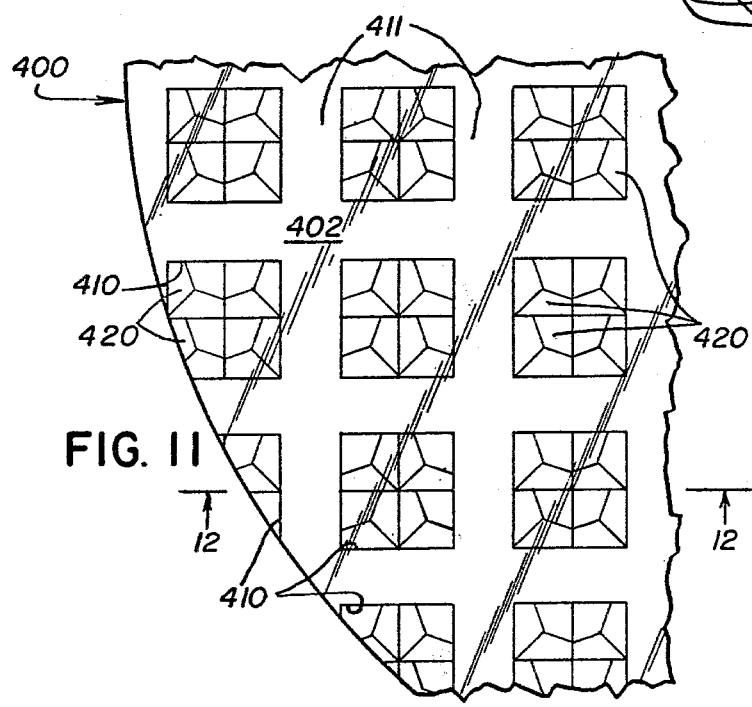
FIG. 11 is a further enlarged plan view of that portion of FIG. 10 enclosed within the dotted area marked 11.
Figure 12:
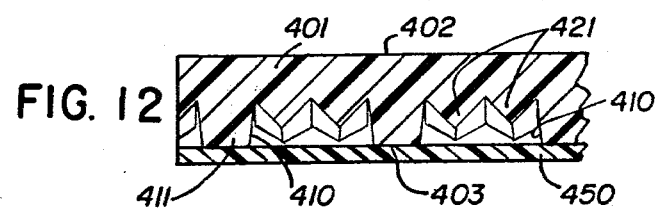
FIG. 12 is a view in vertical section along the line 12—12 of FIG. 11.

The details of construction of the retroreflective sheet 400 are illustrated in FIGS. 10 to 12 of the drawings, wherein it will be seen in FIG. 12 that the sheet 400 includes a body 401 of synthetic organic plastic resin, the preferred resin being a methyl methacrylate resin, the body 401 providing a substantially flat front face 402 and a substantially flat rear face 403. A plurality of recesses or cells 410 are provided in the rear face 403 of the body 401, the recesses also serving to define support walls or ribs 411 that surround each of the recesses or cells 410, the cells 410 being square in shape as viewed perpendicular to the front face 402 and as illustrated in FIG. 11. In order to serve at night as a reflector for light from the headlights of an approaching automobile, each of the cells 410 is provided throughout the area thereof with a plurality of reflector elements 420, the reflector elements 420 being of the retrodirective type and specifically of the cube corner type having the same construction as the reflector elements 220 described above. However, in the form of the invention illustrated in FIGS. 9 to 12, the axes of the reflector elements 420 are disposed normal to the front face 402; the rear apeces of the reflector elements 420 are spaced a small distance forwardly with respect to the rear face 403. Summarizing, it will be appreciated that each of the reflector elements 420 comprises a triple mirror reflex reflector that serves effectively to reflect retrodirectively incident light falling thereon.

From FIGS. 10 and 11 it will be seen that substantially 50% of the total area of the rear of the reflective body 401 is devoted to the flat rear surface 403 and substantially 50% of the total area of the rear of the body 401 is devoted to the cells 410 having disposed therein the reflector elements 420. It also is pointed out that the rear surface 403 is continuous in the sense that any point on the surface can be reached from any other point on the surface without leaving the surface, and it also is pointed out that each of the cells 410 is completely surrounded by the walls 411 and the area thereof completely surrounded by the surface 403. Within each of the cells 410, the area thereof is completely filled by closely packed and interfitting regular geometric shapes, the reflector elements 420 having square outlines. There more specifically is provided in each cell 410 four of the reflector elements 420, the reflector elements having a first orientation with respect to the body 401 in one vertical row of cells 410 and having a second and different orientation with respect to the body 410 in the other vertical rows. It will be understood that other types of retrodirective reflector elements may be used in place of the reflector elements 420, and other geometric shapes and other arrangements of the reflector surfaces can be utilized effectively in the present invention.

It has been found that adequate night time visibility is provided by the retrodirective sheet 400 when the combined area of the cells 410 includes from about 10% to about 90% of the total area of the rear of the body 401, the preferred construction being one in which approximately 50% of the total area of the rear of the body 401 is devoted to the surface 403 and approximately 50% of the rear of the body 401 is devoted to the cells 410. In this connection it is noted that in daylight the cells 410 appear dark and accordingly if positioned on a contrastingly light or colored support 301 will provide daylight visibility also. Alternatively, the surface 403 or an area corresponding to the surface 403 may be colored or provided with material to give at least specular reflection of daylight, whereby the retroreflective sheet 400 would itself provide good visibility in daylight.

It further is desirable that the retroreflective sheet 400 when viewed from the front at a distance from about one hundred feet or more appear uniformly lighted throughout the area thereof and appear to be of the same shape both when lighted by daylight and when lighted by light at night from an oncoming vehicle falling upon the front face 402 in the area thereof corresponding to the cells 410 for reflecting light back toward the vehicle. To this end the major dimensions of each of the cells 410 as viewed in the front face 402 is no greater than about 0.35 inch and the distance between adjacent ones of the cells 410 as viewed in the front face 402 is no greater than about 0.35 inch. When the parts have these dimensions, the human eye at one hundred feet cannot distinguish between or resolve the individual elements seen through the front face 402, whereby the front face 402 appears to be uniformly lighted and of uniform shape both in the daylight when lighted by random light and at night when lighted by headlights of an oncoming vehicle.

The rear of the retroreflective sheet 400 is sealed by a backing member 450 which is preferably a sheet of synthetic organic plastic resin, such as a sheet of acrylic film, that is joined directly to the body 401 as by ultrasonic welding. The backing member 450 serves to cover and hermetically to seal such of the cells 410 in a manner independent of each and every other cell 410 in the retroreflective sheet 400. As a result, the backing member 450 serves positively to exclude water, dirt and the like from the cells 410 and thus to prevent the placement of such materials upon the reflecting surfaces of the reflector elements 420, thereby to preserve unimpaired the optimum light reflecting properties thereof. Since each of the cells 410 is individually sealed independent of each and every other cell, any break in a cell 410 such as the cutting therethrough in the formation of a letter from the sheet 400 will not adversely affect other cells 410 adjacent thereto which are independently hermetically sealed. Consequently, the reflective properties of the sheet 400 are substantially unimpaired by the cutting required to form the letters as illustrated in FIGS. 9 to 12, and the resultant cut letter exhibits greater weatherability and durability in use since any break or impairment in one of the cells 410 will not be propagated to adjacent cells 410 in accordance with the present invention.

The body 401 may be formed of clear synthetic organic plastic resin, whereby a white beam of light is reflected thereby at night. However, a color such as red, blue, yellow and the like may be incorporated in the body 401, thereby to give a colored signal therefrom. It also will be appreciated that the surface 403 or areas on the sheet 400 corresponding to the surface 403 may be colored or provided with light reflecting coatings so as to give at least specular reflection therefrom in daylight.

The letters formed of the retroreflective sheet 400 may be conveniently mounted on the support 301 by means of a suitable resin. In a typical construction of the sheet 400, the distance between the surfaces 402 and 403 is 0.025 inch; the distance between the front face 402 and the innermost point of the recesses forming the cells 410 is 0.01 inch; the thickness from front to rear of the reflector elements 420 is approximately 0.01 inch; the length of the side of each of the cells 410 is 0.04 inch; the width of each side wall 411 between adjacent cells 410 is 0.01 inch; and the thickness of the backing member 450 is 0.003 inch. When the retroreflective sheet 400 has the dimensions noted, it can be readily cut into the shape of various indicia including letters, numerals, arrows, and the like and even if such indicia have complicated shapes, all without adversely affecting the appearance of the resultant indicia and without adversely affecting the retroreflecting properties thereof.

From the above it will be seen that there has been provided a reflector structure which fulfills all of the objects and advantages set forth above. More specifically, there is provided an improved reflector structure 200 that is useful both for reflecting daylight falling generally upon the front face 202 thereof to render the reflector structure 200 highly visible in daylight and for reflecting light falling upon the front face 202 to reflect the light back toward the source thereof from the reflector elements 220 to render the reflector structure 200 highly visible at night in the headlights of a vehicle directed toward the reflector structure 200. The reflector structure 200 more particularly has a plurality of individual cells 210 on the rear thereof surrounded by walls 211 having a rear surface all lying in a common plane to provide a rear face 203, the individual cells 210 comprising from about 10% to about 90% of the total area of the rear face, a preferred arrangement being one wherein approximately 50% of the total area of the rear of the body 201 is the cells 210.

Further there is provided a backing member 250 hermetically sealing each of the cells 210 to prevent an entry of water, dirt and the like thereinto, the rearmost portion 224 of the reflector elements 220 being spaced forwardly a short distance away from the adjacent surface of the backing member 250. As a consequence of this structure, a break in one cell 210 will not cause the loss of reflectivity in adjacent unbroken cells 210, whereby an unusually thin reflector structure having high strength is provided, the walls 211 providing support for the plastic body 201 throughout the rear thereof. In short, better weatherability and greater durability is provided in the reflector structure 200.

It is preferred that the major dimension of each of the cells as viewed in the front face be no greater than about 0.35 inch and that the distances between adjacent cells as viewed in the front face 202 be no greater than about 0.35 inch, whereby when the reflector structure 200 is viewed in the front face 202 at a distance of about one hundred feet or more, it appears uniformly lighted throughout and of the same shape both when lighted by daylight falling upon the front face 202 and when lighted by light from the headlights of an incoming vehicle falling upon the front face and reflected back toward the source of light by the reflector elements, thereby to give good visibility both in daytime and in nighttime.

Finally, there has been provided a retroreflective sheet 400 which can be readily cut into indicia of even complicated shape without materially adversely affecting the appearance of the resulting indicia and without materially adversely affecting the retroreflecting properties thereof.

While there have been described what are at present considered to be certain preferred embodiments of the invention, it will be understood that various modifications can be made therein, and it is intended to cover in the appended claims all such modifications as fall within the true spirit and scope of the invention.

What is claimed is:

1. A reflector structure for reflecting daylight falling thereon and for reflecting light back toward the source thereof, said reflector structure comprising a one-piece body of transparent material having a substantially smooth light receiving front face, said body having therein a plurality of recesses extending from the rear thereof toward said front face and each defining a cell surrounded by a support wall, the rear faces of said support walls defining a continuous support surface extending substantially throughout the rear of said body, a backing member covering substantially all of the rear of said body and hermetically sealed to said support surface along all portions thereof thus hermetically to seal each of said cells, said backing member having associated therewith means defining a light-diffusing, opaque surface in the area corresponding to said support surface, said light-diffusing surface diffusively reflecting from said reflector structure daylight falling upon said front face in the area thereof corresponding to said support surface for reflecting the daylight therefrom to render said reflector structure highly visible in daylight, a plurality of retrodirective reflector elements on said body in said recesses, and oriented therein to reflect light falling upon said front face, said reflector elements reflecting from said reflector structure light falling upon said front face in the area thereof corresponding to said cells for reflecting the light back toward the source thereof to render said reflector structure highly visible at night.

2. The reflector structure set forth in claim 1, wherein said backing member is a sheet of synthetic organic plastic resin welded to said support surface.

3. The reflector structure set forth in claim 1, wherein an adhesive layer is provided to secure said backing member to said support surface, said adhesive layer also providing said reflector surface.

4. The reflector structure set forth in claim 1, wherein the area of said support surface comprises at least about 50% of the total area of said rear face.

5. The reflector structure set forth in claim 1, wherein the major dimension of each of said cells as viewed in said front face is no greater than about 0.35 inch and said support surface comprises at least about 50% of the total area of said rear face, whereby when said reflector structure is viewed in said front face at a distance of about 100 feet it appears to be of the same shape either when reflecting daylight from the area corresponding to said support surface or when illuminated by a source of light reflected from said retrodirective reflector elements in said cells.

6. A reflector structure for reflecting light back toward the source thereof, said reflector structure comprising a one-piece body of transparent material having a substantially smooth light receiving front face, said body having therein a plurality of rectangular recesses extending from the rear thereof toward said front face and each defining a rectangular cell surrounded by a support wall, the rear faces of said support walls defining a substantially continuous support surface extending substantially through-out the rear of said body, and a plurality of rectangular retrodirective cube corner reflector elements on said body in said recesses and oriented therein to reflect light falling upon said front face, said reflector elements reflecting from said reflector structure light falling upon said front face in the area thereof corresponding to said cells and reflecting the light back toward the source thereof to render said reflector structure highly visible at night.

7. The reflector structure set forth in 6, wherein each of said reflector elements has a square outline.

8. A reflector structure for reflecting light back toward the source thereof, said reflector structure comprising a one-piece body of transparent material having a substantially smooth light receiving front face, said body having therein a plurality of rectangular recesses extending from the rear thereof toward said front face and each defining a cell surrounded by a support wall, the rear faces of said support walls defining a substantially continuous support surface extending substantially throughout the rear of said body, a plurality of rectangular retrodirective cube corner reflector elements on said body in said recesses and oriented therein to reflect light falling upon said front face, said reflector elements reflecting from said reflector structure light falling upon said front face in the area thereof corresponding to said cells and reflecting the light back toward the source thereof to render said reflector structure highly visible at night, and a backing member covering substantially all of the rear of said body and hermetically sealed to said support surface along all portions thereof thus hermetically to seal each of said cells.

* * * * *